Feb. 2, 1971      H. E. HELMS      3,560,107

COOLED AIRFOIL

Filed Sept. 25, 1968

INVENTOR.
Harold E. Helms
BY
P. Fitzpatrick
ATTORNEY

United States Patent Office 3,560,107
Patented Feb. 2, 1971

3,560,107
COOLED AIRFOIL
Harold E. Helms, Indianapolis, Ind., assignor to General Motors Corporation, Detroit, Mich., a corporation of Delaware
Filed Sept. 25, 1968, Ser. No. 762,410
Int. Cl. F01d 5/08
U.S. Cl. 416—90                                    3 Claims

ABSTRACT OF THE DISCLOSURE

A convection cooled airfoil for high temperature turbomachines is of laminated structure with an outer layer of thoria dispersed nickel chrome alloy and an inner layer of Hastelloy X. These are bonded together. Grooves in the inner surface of the outer layer and outer surface of the inner layer register to provide passages extending chordwise of the blade in the faces of the blade. Holes in the layers connect these passages to the inner and outer surfaces of the blade to provide for circulation of cooling air through the blade walls in the direction from the leading to the trailing edge.

---

The invention herein described was made in the course of work under a contract or subcontract thereunder with the Department of Defense.

My invention is directed to convection cooled structures, and particularly to cooled airfoils for high temperature turbomachines, such as turbine blades and turbine nozzle vanes.

The invention is particularly directed to a structure providing passages of considerable length extending through the interior of a relatively thin wall of a hollow blade or vane. Another aspect of my invention is the provision of a folded blade or airfoil structure having an outer layer of high temperature resistant material which is unsuited to welding bonded to an inner layer of high temperature resistant material which is weldable and in which the seam at the edge or end of the blade is provided by a weld in the weldable material.

The principal objects of my invention are to improve the efficiency, economy and reliability of high temperature turbomachines, to provide improved airfoil members for such machines, to provide improved cooling structure in an airfoil for high temperature use, to provide an improved composite structure of high temperature resistant material, to provide cooling channels extending parallel to the faces of a thin-walled airfoil element, and to provide an improved procedure for fabricating a thin-walled convection cooled airfoil element.

The nature of my invention and the advantages thereof will be clear to those skilled in the art from the succeeding detailed description of the preferred embodiment of the invention and the accompanying drawings thereof.

FIG. 6 is a cross section of the blade taken in the plane indicated by the line 6—6 in FIG. 1.

FIG. 7 is a cross section of the blade taken in the plane indicated by the line 7—7 in FIG. 1.

Figure 1:
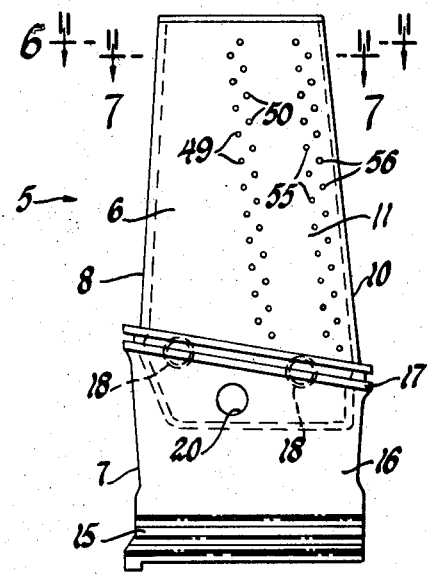
FIG. 1 is an elevation view of a turbine blade embodying the invention, the view being taken in a plane parallel to the axis of the blade root.
Figure 2:
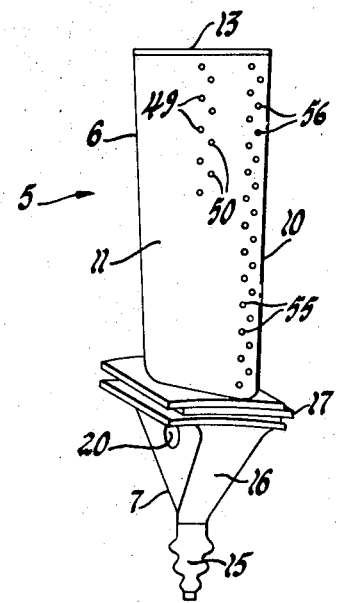
FIG. 2 is a similar view of a blade taken in a plane perpendicular to the axis of the blade root.
Figures 4, 5:
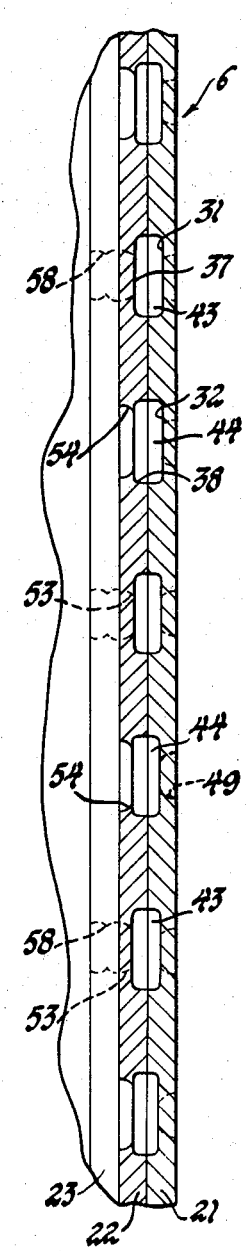
FIG. 4 is a greatly enlarged fragmentary sectional view of the blade wall taken on the plane indicated by the line 4—4 in FIG. 6.
FIG. 5 is a greatly enlarged fragmentary sectional view of the wall of the blade taken in the plane indicated by the line 5—5 in FIG. 7.
Figure 3:
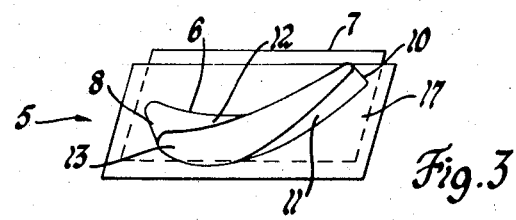
FIG. 3 is a plan or end view of the blade.

FIGS. 1, 2 and 3 are general views of a rotor blade for a turbine. The overall configuration of the blade, apart from the arrangement of cooling passages in the airfoil portion of the blade, may be the same as that described and claimed in my application for Turbine Blade, Ser. No. 707,556, filed Feb. 23, 1968. The prior application is directed principally to the physical attachment of the airfoil to the base of the blade.

Describing this structure briefly, the turbine rotor blade 5 of FIGS. 1, 2 and 3 comprises an airfoil or fluid directing portion 6 and a base 7 by which it is attached to the turbine rotor. The airfoil is a hollow folded sheet metal structure having a leading edge 8 and a trailing edge 10 connected by a convex or low pressure face 11 and a concave or high pressure face 12. The tip of the blade is closed by a cap 13.

The blade base 7 comprises a dovetail root 15, a stalk 16, and a platform 17. When the blade is mounted on the turbine rotor (not shown), the root engages in a suitable dovetail blade slot in the rotor, the stalk connects the root to the airfoil, and the platforms 17 abut to define a boundary of the motive fluid path through the rotor. The base 7 is cast around the sheet metal airfoil to provide a unitary structure as described in the above-mentioned application, the metal of the base extending through tubes 18 integral with the airfoil. The base defines an air entrance hole 20 to admit cooling air into the airfoil from the rotor.

It should be understood, however, that the particular mode of attachment or support for the airfoil is not material to the present invention. Particularly, if the airfoil is a stationary one such as a turbine nozzle vane, the mounting and support of the airfoil ordinarily would be quite different from that illustrated. The vane would ordinarily be supported between two shroud segments or two platforms, one at each end of the airfoil, as is well understood. In this case, either or both ends of the airfoil might be open.

Referring now to FIGS. 4, 5, 6, and 7 for a detailed description of the preferred structure of the fluid directing element or airfoil which is the subject of the present invention, FIGS. 3, 6 and 7 illustrate a typical airfoil cross section, the particular cross section being of course a matter of choice for the particular installation. The airfoil 6 comprises an outer or surface layer or sheet 21 and an inner layer or sheet 22. These extend over the entire surface of the airfoil element and are bonded together to form a unitary laminated structure. The airfoil element illustrated is reinforced against centrifugal stresses directed spanwise of the blade by reinforcing layers 23 bonded to the inner surface of the inner layer over a considerable part of the chord of both faces of the blade. The reinforcing structure would not ordinarily be present in a stator airfoil, and might not in a rotor blade. These three layers are bonded together by any suitable technique; preferably, for the sort of materials contemplated for high temperature use, by known techniques of diffusion bonding so that the sheet which is formed to define the airfoil is a unitary laminated structure of two or more layers or laminae.

The edges of the inner layer are welded together at the trailing edge as indicated at 25 to complete the structure of the airfoil. This is significant because, in the preferred structure of the airfoil, the outer layer is a thoria-dispersed nickel-chromium alloy which does not weld without impairment of its superior heat resisting properties, whereas the inner layer of Hastelloy X can readily be welded. The dispersion reinforced nickel-chrome alloy and the Hastelloy may, however, be diffusion bonded to each other without impairment.

Referring now to the structure defining the cooling air passages within the airfoil, it will be noted that the airfoil defines an interior chamber 26 to which cooling air or other fluid may be supplied in any suitable known manner, as through the hole 20.

The inner face of the surface layer 21 is formed with four sets of chordwise extending grooves in each of the faces 11 and 12 of the airfoil. Grooves 29 extend from the leading edge radius about 40% of the blade chord. Grooves 30, which alternate spanwise of the airfoil with grooves 29, extend from the leading edge radius approximately to the mid-chord of the blade. Grooves 43 and 44 are provided in each face in the trailing portion of the chord, grooves 44 being alternated with grooves 43 and being disposed somewhat nearer to the trailing edge.

The inner layer 22 is formed on its outer surface with four sets of grooves which register with the grooves on the inner surface of the surface layer. These are, grooves 35, 36, 37, and 38 registering with grooves 29, 30, 31, and 32, respectively. These registering sets of grooves define, when the layers are bonded together in register, four sets of cooling air passages indicated as 41, 42, 43, and 44. Air from chamber 26 enters passages 41 and 42 through entrance holes 47 and 48, respectively, disposed immediately at each side of the center of the leading edge of the blade. Air leaves these passages through exit holes 49 and 50, respectively. Similarly, the cooling air enters passages 43 and 44 through entrance holes 53 and 54, respectively, in the inner layer 22, and leaves these passages through exit holes 55 and 56 in the outer layer 21. Where the entrances 53 and 54 would otherwise be covered by the reinforcing layer 23, air is admitted to them through holes 58 in the reinforcing layer. The exit holes 49 and 50 define a staggered line, as do holes 55 and 56.

All of the grooves and holes referred to in the several layers are machined or otherwise formed in any suitable manner, but the preferred method with the sort of materials referred to above is to form these by a photoetching process. The grooves are photoetched into one side of the sheet and the holes which connect them with the other surface of the sheet are etched in from the other side. The holes 58 of the reinforcing layer are created by etching inward from both surfaces of the sheet 23.

The photoetching is well suited to production of small-scale holes and surface relief. By way of illustration of the sort of scale involved, the particular structure illustrated and described is an airfoil of about 4 inches span and 2 inches chord. The layers 21, 22 and 23 are 20 mils (thousandths of an inch) thick. The grooves are 60 mils wide and 10 mils deep so that when registered they produce a passage some 20 by 60 mils, the passages being spaced apart spanwise of the blade by about 60 mils. The holes are slightly smaller than the width of the passages and may be graduated as desired to control the amount of air flow.

It will be quite apparent that this structure provides a very well distributed flow of cooling air through or adjacent the entire surface of the airfoil, the cool air entering at the leading edge and providing the greatest temperature differential at that point, warming up as it flows rearwardly through the passages 41 and 42. Similarly, the air flowing through the passages in the rear part of the chord warms up toward the trailing edge. It will be noted that there is some direct impingement of the air entering through holes 47 and 47 against the surface layer of the blade adjacent the leading edge to increase the rate of heat transfer in this particularly hot area. Air discharged through holes 49 and 50 provides also some film cooling of the airfoil.

It will be noted, of course, that the rate of flow of air, and thus the cooling, depends upon the pressure of the air supplied, the pressure at the point of discharge (which varies over the surface of the blade) and the geometry of the passages. Very flexible apportionment or tailoring of the cooling to the needs is possible by suitable configuration of the passages and the entrance and exit holes as desired.

In the manufacture of the airfoil, the several sheets are first photoetched, then diffusion bonded together, and then formed by usual metal forming process in a die to the desired airfoil shape, after which the trailing edge is welded. Subsequent to this, the airfoil may be suitably mounted in a supporting structure such as the base 7 described here.

It will be apparent to those skilled in the art that the structure described provides a very desirable means for cooling a high temperature airfoil which falls easily within the scope of present-day technology and which provides exceptionally effective distribution of cooling fluid in a thin-walled structure. Furthermore, because of the bonding of the layers of the blade over large areas the structure is essentially monolithic and is quite strong and rigid. The structure according to the invention makes it feasible to employ an outer layer of such materials as dispersion-strengthened nickel-chromium alloys which are exceptionally resistant to the temperature conditions existing in gas turbine engines.

The structure described could also be used for heating or deicing an airfoil, but might not be competitive economically for such purposes.

The detailed description of the preferred embodiment of the invention for the purpose of explaining the principles thereof is not to be considered as limiting or restricting the invention, since many modifications may be made by the exercise of skill in the art.

I claim:

1. A hollow fluid-directing element for a high-temperature turbomachine comprising a surface layer and an inner layer bonded together into a laminated sheet, the sheet being configured to a hollow airfoil section with leading and trailing edges and first and second faces extending from the leading edge to the trailing edge, at least one of the layers having grooves in the surfaces abutting the other layer, the grooves defining an array of generally parallel passages extending chordwise of the airfoil section within the faces between the outer and inner surfaces of the laminated sheet, the inner layer having entrance holes connecting the ends of the grooves nearer the leading edge to the interior of the blade and the surface layer having exit holes connecting the ends of the grooves nearer the trailing edge to the exterior of the blade, the element including also a reinforcing layer bonded to the inner layer and provided with through holes to connect the entrance holes to the interior of the airfoil section.

2. An element as recited in claim 1 in which the exit holes of each set are staggered chordwise of the airfoil section.

3. An element as recited in claim 1 in which the passages are defined by registering grooves in the abutting surfaces of both layers.

References Cited

UNITED STATES PATENTS

| 2,783,966 | 3/1957 | Sörensen | 253—77(M) |
|---|---|---|---|
| 3,011,761 | 12/1961 | Conway et al. | 253—39.15(B) |
| 3,032,314 | 5/1962 | David | 253—39.15(B) |
| 3,067,982 | 12/1962 | Wheeler | 253—39.15(B)X |
| 3,301,526 | 1/1967 | Chamberlain | 253—39.15(B)X |
| 3,301,527 | 1/1967 | Kercher | 253—39.15(B)X |
| 3,373,970 | 3/1968 | Brockmann | 253—39.15(B) |
| 3,468,513 | 9/1969 | Schmitz | 253—39.15(B) |

FOREIGN PATENTS

| 731,161 | 6/1955 | Great Britain | 253—77(Po) |
|---|---|---|---|

SAMUEL FEINBERG, Primary Examiner

U.S. Cl. X.R.

416—95, 229